(12) United States Patent
Colgrove

(10) Patent No.: US 6,904,568 B2
(45) Date of Patent: Jun. 7, 2005

(54) METHOD FOR CUSTOMIZING DEVICE MENU STRUCTURES

(75) Inventor: Elisha Colgrove, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 487 days.

(21) Appl. No.: 10/093,451

(22) Filed: Mar. 11, 2002

(65) Prior Publication Data

US 2003/0169300 A1 Sep. 11, 2003

(51) Int. Cl.[7] .............................................. G06F 15/00
(52) U.S. Cl. ...................................... 715/839; 715/841
(58) Field of Search ................................. 715/835, 839, 715/841, 763; 345/762, 764, 765, 841

(56) References Cited

U.S. PATENT DOCUMENTS 5,602,997 A * 2/1997 Carpenter et al. .......... 345/764
6,344,859 B1 * 2/2002 Alimpich et al. ........... 345/762

* cited by examiner

Primary Examiner—Cao (Kevin) Nguyen

(57) ABSTRACT

A method, program product, and system for customizing an existing menu structure for a device, the method comprising the steps of: determining a plurality of menus for the device GUI; arranging the plurality of menus into a new menu structure that is different from the existing menu structure; storing the new menu structure at a storage location; storing a reference to the storage location; providing a GUI or keystroke or other access to the reference; and setting the device to present menus in accordance with the new menu structure. In one embodiment, the arranging step comprises providing a new order for the menus. In a further embodiment, the step is provided of displaying a plurality of selectable icons or other symbols on a GUI, wherein each different icon or symbol provides access to a storage location for a different new menu structure.

13 Claims, 2 Drawing Sheets

METHOD FOR CUSTOMIZING DEVICE MENU STRUCTURES

FIELD OF THE INVENTION

Present invention relates generally to the field of graphical user interfaces (GUI), and more particularly, to a method and structure for customizing an existing menu structure for a device.

BACKGROUND OF THE INVENTION

As the complexity of various devices increases, the graphical user interfaces (GUI) for those devices present menu structures having increasing complexity. Such complexity may comprise multiple tiers of menus. Certain users may use menus in lower tiers on a frequent basis, but must navigate through the various upper tiers of menus each time a lower tier menu is to be accessed. This navigation requirement presents a significant problem and impacts the efficiency of these users.

SUMMARY OF THE INVENTION

Briefly, the present invention comprises, in one embodiment, a method for customizing an existing menu structure for a device, comprising the steps of: determining a plurality of menus for the device GUI; arranging the plurality of menus into a new menu structure that is different from the existing menu structure; storing the new menu structure at a storage location; storing a reference to the storage location; providing a GUI or keystroke or other access to the reference; and setting the device to present menus in accordance with the new menu structure.

In a variation of the present invention, the device includes a printing function.

In further variation of the present invention, the arranging step comprises providing a new order for the menus.

In a further variation of the present invention, the step is provided of displaying a plurality of selectable icons or other symbols on a GUI, wherein each different icon or symbol provides access to a storage location for a different new menu structure.

In a further variation of the present invention, the arranging step comprises reassigning a plurality of pointers.

In a further variation of the present invention, the arranging step comprises reassigning for each of a plurality of menu items at least one pointer to allow movement between menu items within a same menu tier, and at least one pointer to allow movement between menu items in different menu tiers.

In a further variation of the present invention, the arranging step comprises reassigning for each of a plurality of menu items at least two pointers to allow movement between menu items within a same menu tier, and at least two pointers to allow movement between menu items in different menu tiers.

In a further variation of the present invention, the setting the menu structure step comprises the step of exiting the existing menu structure and initializing to start at a first menu item in the new menu structure.

In a further embodiment of the present invention, a program product is provided for customizing an existing menu structure for a device, comprising machine-readable program code for causing a machine to perform the following method steps of: determining a plurality of menus for the device GUI; arranging the plurality of menus into a new menu structure that is different from the existing menu structure; storing the new menu structure at a storage location; storing a reference to the storage location; providing a GUI or keystroke or other access to the reference; and setting the device to present menus in accordance with the new menu structure.

In a further embodiment of the present invention, a printer is provided, comprising: a print engine; and a processor component programmed to customize an existing printer menu structure by performing the steps of determining a plurality of menus for the device GUI, facilitating arrangement of the plurality of menus into a new menu structure that is different from the existing menu structure, storing the new menu structure at a storage location, storing a reference to the storage location, providing a GUI or keystroke or other access to the reference, and setting the printer to present menus in accordance with the new menu structure.

In a further variation of the present invention, a communications component is provided for accessing a network to store the new menu structure at a storage location on the network.

In a further variation of the present invention, the communications component provides access to the Web.

In a further embodiment of the present invention, a method is provided for changing a menu structure in a device, comprising the steps of: accessing a network location containing storage for a new menu structure; loading the new menu structure on the device; and initializing the device to a menu in the new menu structure.

In a further variation of the present invention, the network location provides a display of a plurality of selectable icons or other symbols on a GUI, wherein each different icon or symbol provides access to a storage location for a different new menu structure.

DETAILED DESCRIPTION OF THE PREFERRED EMBODIMENTS

Figure 1:
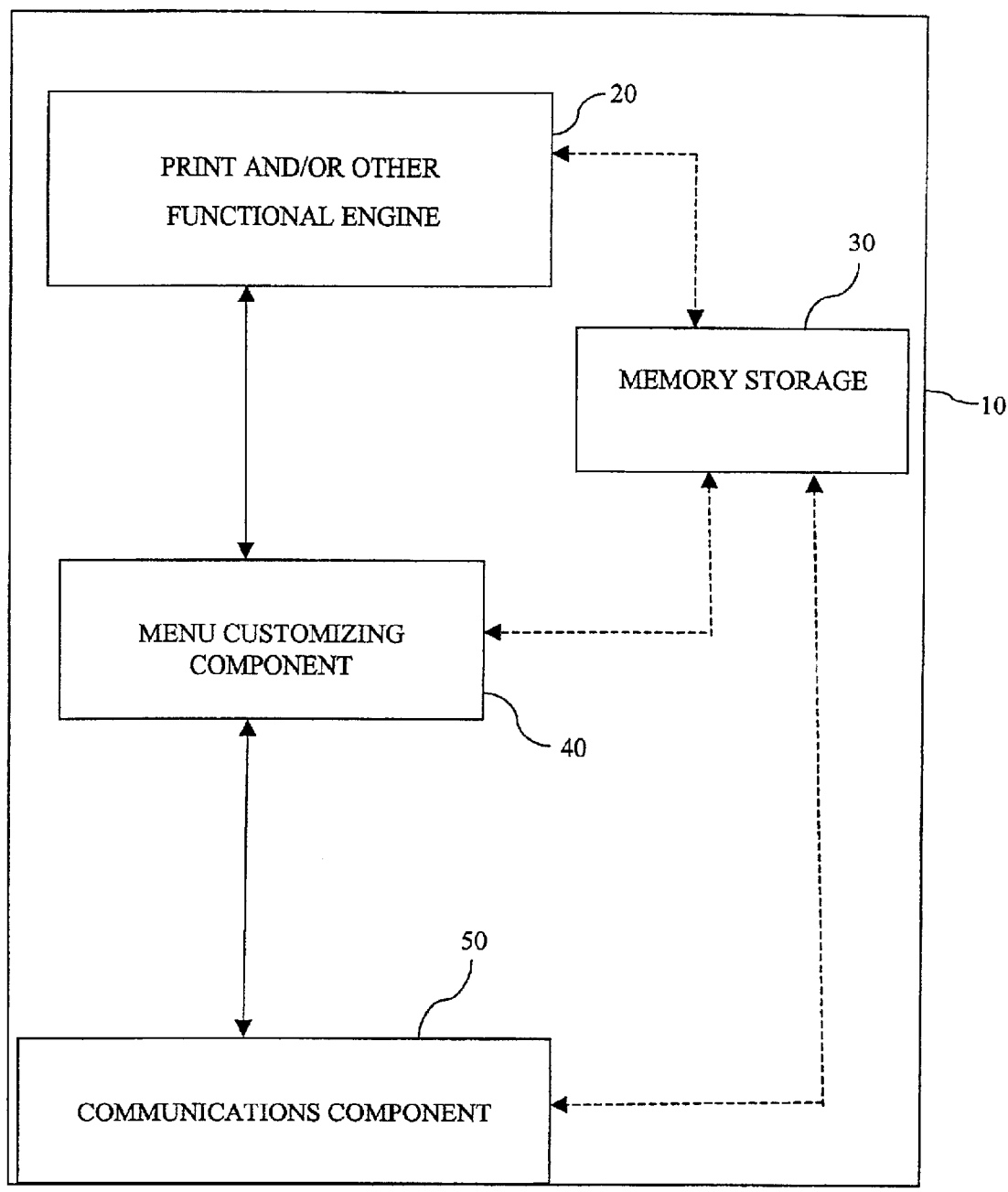
FIG. 1 is a schematic block diagram of a functional device with a menu customizing component in accordance with a preferred embodiment of the present invention.

Referring now to FIG. 1, a standard functional device 10 is shown that includes a functional engine 20. In a preferred embodiment, this functional engine 20 comprises a print engine or a fax engine or a copier engine, or a combination thereof. Such functional engines are well known in the art and may take a variety of forms and configurations.

The device 10 further includes a menu customizing component 30 which allows users to customize an existing menu structure to a new menu structure. In a preferred embodiment, the menus are reordered in a preferred mapping sequence in accordance with a user preference. This new menu structure is then stored at a storage location either at the device, such as memory storage 30, or storage at another convenient location which may be accessible via a communications component 50. Note that the memory storage 30 may be implemented by any convenient memory, but preferably is a memory that provides stable long-term storage.

The communications component 50 may take a variety of different configurations which may access a wide area network (WAN), an internet network, a public telephone network or a private value added network. Alternatively, the communications network can be implemented using any combination of these different kinds of communications network. In a preferred embodiment, the communications component is a TCP/IP communications controller with appropriate digital switching capability accessible over the Internet. Note that the "hardware" portion of this communications component could have a protocol stack which could be ethernet, token ring, Bluetooth, IEEE802.11B, or any other convenient software protocol to facilitate the transfer of IP packets over a network.

It should be recognized that the functional engine 20, the menu customizing component 40, and the communications component 50 may each have its own processor, or there may be only a single processor for performing the functional operations of the device. It should also be noted that one or more of the functions of the device 10 may be implemented by processor systems that are connected over the network to the communications component 50. Thus, the processing may be distributed over a multitude of sites suitably connected together using conventional networking or internet-working techniques.

Figure 2:
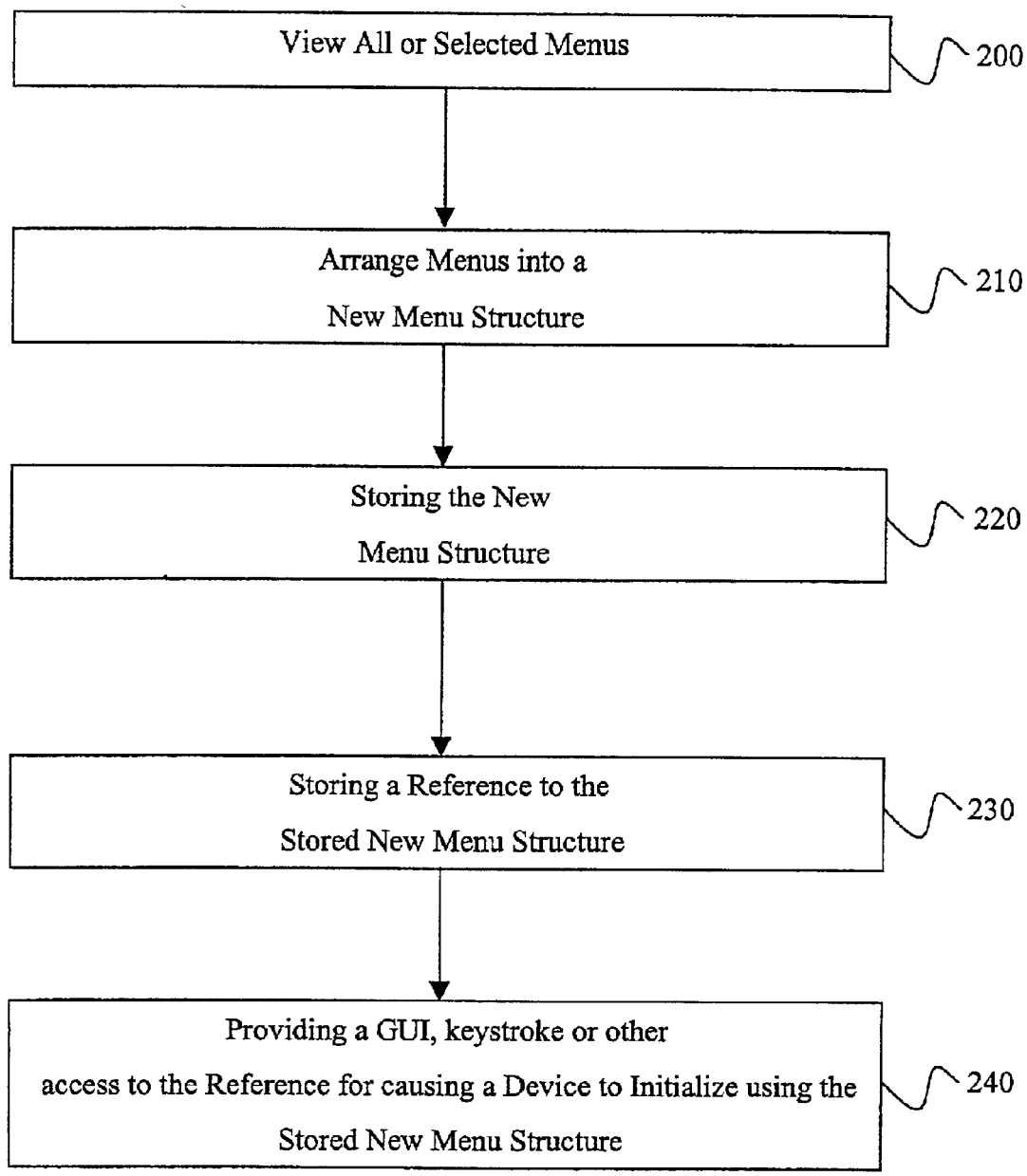
FIG. 2 is a flow chart of a preferred embodiment for implementing the menu customizing component 30 of FIG. 1.

Referring now to FIG. 2, there is shown a block diagram of a preferred method of implementing the menu customizing component 40. In block 200, an operation is provided to allow the viewing of all or a selected number of menus in an existing menu structure for the functional engine 20.

Referring to block 210, one or more menus may be arranged into a new menu structure. By way of example, but not by way of limitation, an existing menu structure is shown in Appendix A. After the performance of the arranging step in block 210, the menu structure may take the form as shown in Appendix B. The arranging step may be performed using a variety of different techniques. By way of example, but not by way of limitation, a user may simply drag and drop menu commands between different tiers of the menu structure. With this drag and drop technique, the existing menu structure can be completely rearranged by the user and renamed as desired. Alternatively, the user might simply designate with a key stroke or other means particular menu items to a particular tier in the menu structure. Child menu items which map to the designated menu item may, in a preferred embodiment, be automatically moved to a menu tier that is one tier lower than the new tier for the menu item that has been moved. This operation would be implemented by changing the pointers from this moved menu item so that they continue to point to the child menu items that this moved menu item initially mapped to.

In a preferred embodiment, the mapping of the menu item within the menu structure is accomplished by means of pointers. For example, there would be a first set of pointers for each menu item, comprising at least one pointer and preferably two pointers to allow movement between menu items within a same menu tier. Additionally, there would typically be a second set of pointers for each menu item, comprising at least one pointer and preferably two pointers, to allow movement between menu items in different menu tiers. Accordingly, in an embodiment utilizing pointers, if a drag and drop method is utilized, or if a reassignment of menu items by means of another convenient method is utilized, the pointers for the moved menu items are reassigned based on the locations to which the memory items has been moved in the menu structure. For example, if the memory item PRINT FAX LOG NOW is moved to the first tier of the menu structure below the COPY SETUP, then the first set of pointers for the PRINT FAX LOG NOW will be reassigned so that one pointer points up to the COPY SETUP menu item, and one pointer points down to the FAX SETUP menu item. Likewise, the second set of pointers for changing tiers for the PRINT FAX LOG NOW menu item would be reassigned so that a pointer points to the DEMO PAGE menu item. Each moved menu item would have its pointers reassigned in a similar fashion so that at the end of the process, a new menu structure is created. It can be seen that the program and structure required to implement this embodiment using pointers would simply determine the preceding menu item and the succeeding menu item in the tier to which the moved menu item has been moved, and then reassigning the first set of pointers for this moved menu item to point to these respective menu items within the same menu tier. Likewise, the programming structure would include a step to determine which menu items in higher and lower tiers of the menu structures are adjacent to the moved menu items. The pointers in the second set of pointers for moving between tiers would then be reassigned to point to the respective adjacent menu items in the higher tier and the lower tier of the menu structure. In a preferred embodiment, the pointer to the lower tier may be automatically assigned to child menu items associated with the moved menu item.

It should be noted that there are other methods of implementing the menu arranging steps which would be evident to one of ordinary skill in the art.

Referring now to block 220, the new memory structure is stored. In one embodiment, this new memory structure may be stored in the memory storage 30 at the device 10 itself. In a different embodiment, the new menu structure may be transferred via the communications component 50 to a menu storage on the network, which may be non-volatile storage.

Referring now to block 230, a reference for this storage location for the stored new menu structure may then be stored at a convenient location so that it is accessible by the user.

Referring now to block 240, a GUI, keystroke or other convenient access to the reference is then provided for causing the device 10 to initialize using the stored memory structure. In one embodiment, a graphical user interface could be provided displaying one or more selectable icons or other designators, which the user may click on in order to activate a method to cause the device to initialize using the stored new menu structure. In a situation where the device 10 has already initialized to an existing menu structure, then the method would first exit this existing menu structure and then initialize to start at a first menu item in the new menu structure.

In a preferred embodiment, a plurality of selectable icons or other symbols may be displayed on the GUI, with each different icon or symbol providing access to a storage location for a different new menu structure. The device may then be initialized to this selected new menu structure based on the user's selection.

The foregoing description of the preferred embodiment of the invention has been presented for purposes of illustration and description. It is not intended to be exhaustive or to limit the invention to the precise form disclosed, and modifications and variations are contemplated in light of the above teachings or may be acquired from practice of the invention. The embodiment was chosen and described in order to explain the principles of the inventions and its practical application to enable one skilled in the art to utilize the invention in various embodiments and with various modifications that are suited to the particular use contemplated. It is intended that the scope of the invention be defined by the claims appended hereto, and their equivalents.

What is claimed is:

1. A method for customizing an existing menu structure for a device, comprising the steps of:
   providing a plurality of menus items arranged in a plurality of tiers in an existing menu structure for the device GUI, with each of a plurality of the menu items having at least one pointer associated therewith and with each of the at least one pointers providing a reference to one of the menu items that succeeds or precedes the associated menu item;
   designating one of the menu items to relocate;
   determining a desired location in the menu structure for the designated menu item;
   moving the designated menu item to the desired location to create a new menu structure;
   changing the at least one pointer associated with the designated menu item to provide a reference to one of the menu items that succeeds or precedes the designated menu item in the new menu structure;
   storing the new menu structure at a storage location;
   storing a reference to the storage location;
   providing a GUI or keystroke or other access to the reference; and
   setting the device to present menus in accordance with the new menu structure.

2. The method as defined in claim 1, wherein the device includes a printing function.

3. The method as defined in claim 1, further comprising the step of displaying a plurality of selectable icons or other symbols on a GUI, wherein each different icon or symbol provides access to a storage location for a different new menu structure.

4. The method as defined in claim 1, wherein the changing step comprises reassigning for each of a plurality of menu items at least one pointer to allow movement between menu items within a same menu tier, and at least one pointer to allow movement between menu items in different menu tiers.

5. The method as defined in claim 1, wherein the changing step comprises reassigning for each of a plurality of menu items at least two pointers to allow movement between menu items within a same menu tier, and at least two pointers to allow movement between menu items in different menu tiers.

6. The method as defined in claim 1, wherein the setting the device step comprises the step of exiting the existing menu structure and initializing to start at a first menu item in the new menu structure.

7. A method as defined in claim 1, wherein the changing step comprises:
   determining the tier of the menu structure in which the desired location is arranged;
   within the tier, determining the menu item preceding the desired location and the menu item succeeding the desired location;
   changing the pointers associated with the designated menu item to provide a reference to the preceding menu item and a reference to the succeeding menu item;
   determining an adjacent menu item arranged in a higher tier than the desired location and an adjacent menu item arranged in a lower tier than the desired location; and
   changing the pointers associated with the designated menu item to provide a reference to the adjacent menu item in the higher tier and the adjacent menu item in the lower tier.

8. A method as defined in claim 1, wherein each of the plurality of menu items may be a menu command or a menu heading, and wherein each menu heading is associated with a plurality of child menu items.

9. A method as defined in claim 8, wherein the moving step further comprises:
   determining that the designated menu item is a menu heading;
   automatically moving the associated child menu items to a location one tier below the desired location in the menu structure; and
   changing the at least one pointer associated menu heading to provide a reference to the child menu items associated with the menu heading.

10. A program product for customizing an existing menu structure for a device, comprising machine-readable program code for causing a machine to perform the following method steps of:
    providing a plurality of menu items arranged in a plurality of tiers in an existing menu structure for the device GUI, with each of a plurality of the menu items having at least one pointer associated therewith and with each of the at least one pointers providing a reference to one of the menu items that succeeds or precedes the associated menu item;
    designating one of the menu items to relocate;
    determining a desired location in the menu structure for the designated menu item;
    moving the designated menu item to the desired location to create a new menu structure;
    changing the at least one pointer associated with the designated menu item to provide a reference to one of the menu items that succeeds or precedes the designated menu item in the new menu structure;
    storing the new menu structure at a storage location;
    storing a reference to the storage location;
    providing a GUI or keystroke or other access to the reference; and
    setting the device to present menus in accordance with the new menu structure.

11. A printer, comprising:
    a print engine; and
    a processor component programmed to customize an existing printer menu structure by performing the steps of providing a plurality of menu items arranged in a plurality of tiers in an existing menu structure for the device GUI, with each of a plurality of the menu items having at least one pointer associated therewith and with each of the at least one pointers providing a reference to one of the menu items that succeeds or precedes the associated menu item, designating one of the menu items to relocate, determining a desired location in the menu structure for the designated menu item, moving the designated menu item to the desired location to create, creating a new menu structure, changing the at least one pointer associated with the designated menu item to provide a reference to one of the menu items that succeeds or precedes the designated menu item in the new menu structure, storing the new menu structure at a storage location, storing a reference to the storage location, providing a GUI or keystroke or other access to the reference, and setting the printer to present menus in accordance with the new menu structure.

12. The printer as defined in claim 11, further comprising a communications component for accessing a network to store the new menu structure at a storage location on the network.

13. The printer as defined in claim 12, wherein the communications component provides access to the Web.

* * * * *